US005087372A

United States Patent [19]

Toyomoto et al.

[11] Patent Number: 5,087,372
[45] Date of Patent: Feb. 11, 1992

[54] METHOD FOR REMOVING HEAVY METAL IONS FROM CONTAMINATED WATER AND A POROUS MEMBRANE USABLE THEREFOR

[75] Inventors: Kazuo Toyomoto; Takehiko Otoyo, both of Yokohama, Japan

[73] Assignee: Asahi Kasei Kogyo Kabushiki Kaisha, Osaka, Japan

[21] Appl. No.: 493,751

[22] Filed: Mar. 15, 1990

[30] Foreign Application Priority Data

Mar. 24, 1989 [JP] Japan ................... 1-70407
Jun. 16, 1989 [JP] Japan ................... 1-152415
Jun. 26, 1989 [JP] Japan ................... 1-160858

[51] Int. Cl.$^5$ ............... B01D 61/00; B01D 33/21
[52] U.S. Cl. ................... 210/651; 210/653; 210/654; 210/500.23; 210/500.27; 210/500.35; 210/912
[58] Field of Search .......... 210/638, 654, 653, 639, 210/688, 665, 679, 719, 651, 912, 500.23, 500.27, 500.35; 502/402

[56] References Cited

U.S. PATENT DOCUMENTS

| | | | |
|---|---|---|---|
| 3,872,001 | 3/1975 | Davis et al. | 210/638 |
| 3,957,504 | 5/1976 | Ho et al. | 210/638 |
| 4,741,831 | 3/1988 | Grinstead | 210/638 |

FOREIGN PATENT DOCUMENTS

| | | | |
|---|---|---|---|
| 53-65785 | 6/1978 | Japan. | |
| 2201604 | 9/1987 | Japan | 210/654 |
| 1176999 | 7/1989 | Japan | 210/653 |

*Primary Examiner*—Robert A. Dawson
*Assistant Examiner*—Ana Fortuna
*Attorney, Agent, or Firm*—Birch, Stewart, Kolasch & Birch

[57] ABSTRACT

A method for simultaneously removing a plurality of different heavy metal ions from contaminated water is disclosed. A plurality of different heavy metal ions can be simultaneously, efficiently removed by filtering contaminated water through a porous membrane comprising a membranous, porous resin matrix and a plurality of side chains chemically bound to both surfaces and pore wall surfaces of the matrix, which side chains each have a chelate group, preferably an iminodiacetic acid group, and terminating the filtration when the concentration of a determinant heavy metal ion in the filtrate reaches a predetermined level. By the method of the present invention, a plurality of different heavy metal ions, such as a cobalt ion and a nickel ion, can be simultaneously, efficiently removed from contaminated water, such as water to be used for and waste water from a nuclear power generator, on a commercial scale.

4 Claims, No Drawings

5,087,372

METHOD FOR REMOVING HEAVY METAL IONS FROM CONTAMINATED WATER AND A POROUS MEMBRANE USABLE THEREFOR

BACKGROUND OF THE INVENTION

1. Field of the Invention

The present invention relates to a method for simultaneously removing a plurality of different heavy metal ions from contaminated water. More particularly, the present invention is concerned with a method in which a plurality of different heavy metal ions, such as a nickel ion and a cobalt ion, are efficiently removed from contaminated water, for example, water to be used for and waste water from a nuclear power generator. The present invention is also concerned with a heavy metal ion-adsorptive, porous membrane, which is especially useful for simultaneous removal of a plurality of different heavy metal ions from contaminated water.

2. Discussion of Related Art

Conventionally, an ion exchange resin has been used for removing a plurality of different heavy metal ions from contaminated water, for example, water to be used for and waste water from a nuclear power generator. The conventionally employed ion exchange resin is used in the form of a spherical gel having a relatively large particle size, e.g., having a particle diameter of tens of micrometers. When contaminated water is passed through the gels, the ions present in the contaminated water are adsorbed on the gels due to the diffusion (equilibrium) of the ions between the stream of contaminated water and the interior portions of the gels. The efficiency of adsorption of the ions on the gel depends on the balance of the diffusion rate of the ions into the gels and the diffusion rate of the ions into the stream of contaminated water. In this connection, it is noted that since the particle size of the gel of ion exchange resin is relatively large, the gaps between the gels are also large. Therefore, the ions are likely to pass through the gaps so that the adsorption efficiency is lowered. Accordingly, for sufficiently removing the ions from contaminated water by adsorption on the gels, it is necessary that the contaminated water be passed through a large quantity of gels. When contaminated water contains a plurality of different heavy metal ions, complicated reactions, namely, adsorption and desorption of each of the different ions, are caused to occur during the passage of the contaminated water through the gels due to the competition between the ions having different adsorption equilibriums for the gel. Therefore, the efficiency of adsorption is much lower when the removal of different heavy metal ions from contaminated water is intended. For sufficiently removing different heavy metal ions from contaminated water, it is necessary to use an extremely large quantity of ion exchange resin. Further, the flow rate of contaminated water passing through the gels must be strictly controlled for pre-venting the leakage of ions. Moreover, complicated, delicate change of operation is needed according to the variation in quality of contaminated water, such as variations of the types and amounts of coexisting ions. Therefore, the operation is extremely troublesome.

SUMMARY OF THE INVENTION

The present inventors have made extensive and intensive studies with a view toward solving the above-mentioned problems of the conventional method in which an ion exchange resin is used. As a result, it has unexpectedly been found that a porous membrane comprising a membranous resin matrix and, bound thereto, a plurality of side chains each having a chelate group is extremely suitable for removing a plurality of heavy metal ions. It has also been found that a porous membrane having an iminodiacetic acid group as a chelate group is especially useful for simultaneously, efficiently removing a plurality of heavy metal ions which are contained in contaminated water, for example, water to be used for and waste water from a nuclear power generator. On the basis of these novel findings, the present invention has been completed.

Accordingly, it is an object of the present invention to provide a method for simultaneously removing a plurality of different heavy metal ions from contaminated water.

It is another object of the present invention to provide a heavy metal ion-adsorptive, porous membrane, which is especially useful for simultaneously, efficiently removing a plurality of different heavy metal ions from contaminated water.

The foregoing and other objects, features and advantages of the present invention will be apparent to those skilled in the art from the following detailed description and appended claims.

DETAILED DESCRIPTION OF THE INVENTION

Essentially, according to the present invention, there is provided a method for simultaneously removing a plurality of different heavy metal ions from contaminated water containing the different heavy metal ions, which comprises:

(1) filtering contaminated water containing a plurality of different heavy metal ions through a porous membrane comprising a membranous, porous resin matrix and a plurality of side chains chemically bound to both surfaces of said matrix, in which the both surfaces are inclusive of pore wall surfaces, each side chain having a chelate group, to obtain a filtrate, and (2) terminating the filtration when the concentration of a determinant heavy metal ion in the filtrate reaches a predetermined level, wherein the determinant heavy metal ion is defined as a heavy metal ion which, among the different heavy metal ions, exhibits a maximum adsorption equilibrium for the chelate group and wherein the predetermined level does not exceed 1/10 of the concentration of the determinant heavy metal ion in the contaminated water.

In the present invention, the term "contaminated water containing a plurality of different heavy metal ions" defines water containing at least two types of heavy metal ions. Examples of heavy metal ions include an iron ion, a copper ion, a cobalt ion, a nickel ion and the like. Examples of contaminated water include water to be used for and waste water from a nuclear power generator, and the like.

In step (1), contaminated water is filtered through a porous membrane. The porous membrane which may be used in the method of the present invention comprises a membranous, porous resin matrix and a plurality of side chains chemically bound to both surfaces of the matrix, in which both surfaces are inclusive of pore wall surfaces. Each side chain has a chelate group.

The membranous, porous resin matrix of the porous membrane which may be used in the method of the present invention, can be comprised of a polyolefin, a copolymer of an olefin and a halogenated olefin, a polyvinylidene fluoride or a polysulfone. Of these, the polyolefin and the copolymer of an olefin and a halogenated olefin are preferred.

Examples of polyolefins include polyethylene, polypropylene, polybutylene and mixtures thereof. Examples of copolymers of an olefin and a halogenated olefin include copolymers of at least one olefin selected from ethylene, propylene, butene, pentene and hexene, and a halogenated olefin, such as tetrafluoroethylene and chlorotrifluoroethylene.

The membranous, porous resin matrix has pores therewithin and openings on both surfaces thereof. The pores cooperate with the openings to form throughpaths running between both the surfaces of the resin matrix. The pores of the membranous, porous resin matrix can be formed by various conventional methods. For example, the pores can be formed by a stretching method in which a membranous resin matrix is stretched or by an etching method in which a membranous resin matrix is exposed to an electron ray and then chemically treated. The pores of the membranous resin matrix formed by the stretching method or the etching method have a simple structure such that the formed pores run directly through the membranous resin matrix in a thicknesswise direction. Further, the pores can also be formed by a micro-phase separation method or a mixing and extraction method. The pores formed by the above-mentioned methods assume a three-dimensional network structure of pores. The three-dimensional network structure of pores is most preferred in the present invention. In this respect, reference may be made to, for example, Japanese Patent Application Publication Specification No. 60-23130.

The membranous, porous resin matrix can be in any form, that is, it can be a flat membrane, including a pleat type membrane and a spiral type membrane, a tubular membrane and a hollow fiber membrane, and the shape of the membranous, porous resin matrix can suitably be selected according to the use of the porous membrane. In the method of the present invention, a hollow fiber membrane is most preferred.

Examples of chelate groups include a polyamine group, an iminodiacetic acid group and the like. When water to be used for and waste water from a nuclear power generator is intended to be treated according to the method of the present invention, the iminodiacetic acid, which is represented by the formula:

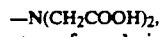
—N(CH$_2$COOH)$_2$, is most preferred since the iminodiacetic acid group is capable of effectively bonding thereto a cobalt ion and a nickel ion which are usually contained in water to be used for and waste water from a nuclear power generator.

Further, it is preferred that the porous membrane have an average pore diameter of 0.01 to 5 μm and a porosity of 20 to 90%. The methods for determining the average pore diameter and porosity will be described later.

It is preferred that the contaminated water to be filtered through the membrane have a pH value of at least 3 from the standpoint of efficiency of removal of the heavy metal ions. When the pH value of contaminated water is less than 3, it is preferred that the pH value of the contaminated water be adjusted to at least 3 prior to the filtration. For adjusting the pH value of the contaminated water, a hydroxide of an alkali metal, such as lithium hydroxide and sodium hydroxide, may generally be added to the contaminated water.

By the filtration of contaminated water through the membrane, a filtrate is obtained.

In step (2), the filtration is terminated when the concentration of a determinant heavy metal ion in the filtrate reaches a predetermined level. The determinant heavy metal ion is a specific heavy metal ion, the one among the plurality of different heavy metal ions to be removed from contaminated water, which exhibits a maximum adsorption equilibrium. That is, the determinant heavy metal ion is the one defined as the heavy metal ion which is adsorbed on the porous membrane in a maximum molar amount, among the plurality of the different heavy metal ions when the porous membrane is immersed in water containing equimolar amounts of the heavy metal ions. The determinant heavy metal ion is determined depending on the type of contaminated water. For example, when the porous membrane is immersed in an aqueous solution containing equimolar amounts of a cobalt ion and a nickel ion, the nickel ion is adsorbed on the porous membrane in a molar amount larger than the molar amount of the cobalt ion adsorbed, irrespective of whether the contaminated water is acidic or alkaline. Therefore, in the case where the ions contained in contaminated water are a cobalt ion and a nickel ion, the determinant heavy metal ion of the contaminated water is a nickel ion.

The present inventors have unexpectedly found that even when the plurality of different heavy metal ions are largely different in adsorbability by the chelate group of the porous membrane, the efficiency of adsorption of all of these different heavy metal ions depends on the efficiency of adsorption of the above-defined determinant heavy metal ion. For example, in the above-mentioned case where contaminated water contains a cobalt ion and a nickel ion, the efficiency of adsorption of all of the cobalt and nickel ions depends upon the efficiency of adsorption of the nickel ion. This means that the behavior of the adsorption of heavy metal ions on the porous membrane is fundamentally different from that of the adsorption of heavy metal ions on the conventional ion exchange resin. That is, in the case of the method of the present invention, the adsorption of different heavy metal ions on the porous membrane begins at one surface of the porous membrane on the side of the contaminated water and advances, in a layer-wise fashion, toward the other surface of the porous membrane on the side of the filtrate through the interior of the porous membrane with time, differing from the case where an ion exchange resin is used. This difference is described below in greater detail.

In the case of the method using an ion exchange resin which is generally in a granular form and has a relatively large particle diameter, e.g., a particle diameter of tens to hundreds of micrometers, heavy metal ions are adsorbed in a manner such that the ion exchange between the heavy metal ions and a hydrogen ion or other ions of the ion exchange resin advances from the surface of the ion exchange resin toward the interior of the ion exchange resin. In the course of this advance, the different heavy metal ions are com-petitive with one another with respect to adsorption on the resin. For example, in the case of a cobalt ion and a nickel ion, since the adsorption equilibrium of a nickel ion is higher than that of a cobalt ion, a cobalt ion once adsorbed on the resin is likely to be expelled by the action of a nickel ion, and the nickel ion is substituted therefor. The expelled cobalt ion is no longer readily adsorbed on the ion exchange resin again due to the strong competitive force of the nickel ion, so that the cobalt ion is returned to the contaminated water. Thus, the nickel ion having high adsorbability for the resin is adsorbed on the ion exchange resin, but the cobalt ion is hardly adsorbed on the ion exchange resin.

By contrast, in the case of the method of the present invention, for example, when contaminated water containing a cobalt ion and a nickel ion is filtered through the porous membrane, both of these ions can be effectively adsorbed on the membrane. The reason why this can be possible is as follows. The adsorption equilibrium of the nickel ion is higher than that of the cobalt ion and, therefore, even when the cobalt ion is once adsorbed on one portion of the wall surface of the pore of the porous membrane, the cobalt ion is likely to be expelled by the action of the nickel ion. However, the expelled cobalt ion can readily be adsorbed again on the other portion of the wall surface of the pore of the porous membrane, as long as the chelate groups of the wall surface of the pore of the membrane are substantially not saturated, i.e., until a break-through point (which is described below) is reached. This differs from the case where an ion exchange resin is used. That is, the adsorption of different heavy metal ions on the porous membrane begins at one surface of the porous membrane on the side of the contaminated water and advances, in a layerwise fashion, toward the other surface of the porous membrane on the side of the filtrate through the interior of the porous membrane with time. Due to this mechanism of adsorption, even when the plurality of different heavy metal ions contained in contaminated water exhibit different adsorption equilibriums for the chelate group, the different heavy metal ions can be simultaneously and efficiently removed by the method of the present invention.

In the method of the present invention, as mentioned above, when the concentration of a determinant heavy metal ion in the filtrate reaches a predetermined level, the filtration is terminated. The predetermined level of the concentration of the determinant heavy metal ion does not exceed 1/10 of the concentration of the determinant heavy metal ion in the contaminated water. If desired, the filtration may be terminated before a break-through point is reached with respect to the determinant heavy metal ion. For example, when contaminated water to be treated contains radioactive $^{58}Co$ and $^{60}Co$ ions, it is desired to reduce the concentration of each of the $^{58}Co$ and $_{60}Co$ ions to a level as low as possible, e.g., a level lower than 1 ppt (part per trillion) and, therefore, in that case, the filtration is preferably terminated before a break-through point is reached so that substantially all of the $^{58}Co$ and $^{60}Co$ ions can be removed by filtration.

The terminology "break-through point" is generally used to define a point at which the concentration of an ion in a filtrate is rapidly, sharply increased during the filtration. In the present invention, the break-through point is generally a point at which, during the filtration, the concentration of a determinant heavy metal ion in a filtrate becomes 1/100 of the concentration of the determinant heavy metal ion in contaminated water (before filtration). When 1/100 of the concentration of a determinant heavy metal ion in the original contaminated water is too small to effect detection thereof, a point at which a detectable lower limit of the concentration is reached is defined as a break-through point.

In connection with the above, it is to be noted that when filtration of contaminated water is conducted at extremely high flow rate, it is possible that the concentration of a determinant heavy metal ion in a filtrate becomes greater than 1/100 of the concentration of the determinant heavy metal ion in the original contaminated water at an initial stage of the filtration.

With respect to the porous membrane to be used in the method of the present invention, a porous membrane having an iminodiacetic acid group as a chelate group is novel and especially useful for simultaneous removal of a plurality of different heavy metal ions from contaminated water.

Accordingly, in another aspect of the present invention, there is provided a heavy metal ion-adsorptive, porous membrane comprising a membranous, porous resin matrix and a plurality of side chains chemically bound to both surfaces of the matrix, in which the both surfaces are inclusive of pore wall surfaces, each side chain having bonded thereto an iminodiacetic acid group in an amount of 0.3 to 10 milliequivalents per gram of the porous membrane, the porous membrane having an average pore diameter of 0.01 to 5 μm and a porosity of 20 to 90%.

As examples of membranous, porous resin matrices for the porous membrane of the present invention, those which are described above may be mentioned.

The porous membrane of the present invention has a plurality of side chains which are chemically bound directly to both surfaces, in which both surfaces are inclusive of the pore wall surfaces of the membranous, porous resin matrix. Further, an iminodiacetic acid group as a chelate group is chemically bonded to each of the side chains.

In the present invention, the amount of iminodiacetic acid group (hereinafter often referred to simply as "chelate group") is frequently expressed in terms of milliequivalent. With respect to the iminodiacetic acid group, 1 millimole is equal to 2 milliequivalents.

The amount of the chelate groups bonded to the side chains is from 0.3 to 10 milliequivalents, preferably from 1.5 to 10 milliequivalents, per gram of the porous membrane. When the amount of the iminodiacetic acid groups is less than 0.3 milliequivalent per gram of the porous membrane, the efficiency of adsorption of the heavy metal ions is too low to attain the object of the present invention. On the other hand, when the amount of the iminodiacetic acid groups is larger than 10 milliequivalents per gram of the porous membrane, the water permeability and the mechanical properties of the porous membrane are markedly decreased, so that the porous membrane cannot be put in practical use.

In the present invention, the amount (milliequivalent per gram of the porous membrane) of the iminodiacetic acid is determined, based on the value obtained by the chemical analysis of the porous membrane with respect to 0.1 to several grams of the membrane as a sample in order to avoid an error due to any non-uniform distribution of the groups in the microstructure of the porous membrane.

The amount of the iminodiacetic acid groups contained in the side chains can be determined by a customary gravimetric method. In this method, the amount of the iminodiacetic acid group is calculated from the amount of the weight increase of the porous membrane between before and after the bonding of the iminodiacetic acid groups. The amount of the iminodiacetic acid contained in the side chains may also be determined by a cobalt ion adsorption equilibrium method. In this method, the porous membrane is immersed in a solution containing cobalt ions for 48 hours, Then the resultant porous membrane having the cobalt ions adsorbed thereon are treated with an aqueous HCl solution to desorb the colbalt ions. The amount of the cobalt ions desorbed from the membrane and dissolved in the solution is determined by atomic absorption spectrometry. The amount of the cobalt ions corresponds to the amount of the iminodiacetic acid groups bonded to the side chains can be calculated from the amount of the cobalt ions determined by atomic absorption spectrometry.

The porous membrane of the present invention has an average pore diameter of 0.01 to 5 μm, preferably 0.01 to 1 μm, from the viewpoint of the ion-adsorptivity and water permeability of the porous membrane. When apparent membrane volume(ml) the average pore diameter is less than 0.01 μm, the water permeability is decreased, leading to disadvantages in practice. When the average pore diameter is larger than 5 μm, some of the heavy metal ions are not adsorbed on the pore wall surface of the porous membrane but would pass through the pores of the porous membrane without contacting the pore wall surface, so that the effective adsorption of the heavy metal ions cannot be attained.

In the present invention, an average pore diameter is determined according to a customary air flow method as described in ASTM F 316-70.

The porosity of the porous membrane of the present invention is in the range of from 20 to 90%, preferably 50 to 80%. The porosity is determined as follows. The weight $(W_1)(g)$ of the membrane after it has been saturated with water, and the weight $(W_2)(g)$ of the membrane after it has been dried are individually measured. The porosity of the porous membrane is calculated from the weights $W_1$ and $W_2$ by the following formula, assuming that the density of water is 1.0 g/ml:

$$\text{Porosity (\%)} = \frac{(W_1(g) - W_2(g)) \div g/ml}{\text{apparent membrane volume(ml)}} \times 100.$$

When the porosity is less than 20%, the water permeability of the porous membrane is disadvantageously decreased. On the other hand, when the porosity is more than 90 %, the mechanical properties of the porous membrane are lowered. The side chain chemically bound to the resin matrix may be comprised of polyglycidyl methacrylate or polystyrene. Of these, polyglycidyl methacrylate is preferred in the present invention.

In the present invention, the presence of the side chains bound to the both surfaces of the resin matrix, in which the both surfaces are inclusive of pore wall surfaces, can be detected by electron probe X-ray microanalysis (hereinafter referred to as "EPMA") or electron spectroscopy for chemical analysis (hereinafter referred to as "ESCA"). For accurately determining the amount of the side chains, it is preferred that copper ions be adsorbed on the porous membrane and then subjected to EPMA.

The porous membrane of the present invention may be in any form, that is, it can be a flat membrane, a hollow fiber membrane or a tubular membrane. Among these forms, a hollow fiber membrane is preferred, because it has a large effective surface area, and a cross-flow filtration can be conducted without the danger of a clogging of the membrane.

The iminodiacetic acid group may be introduced in the material of the membrane before shaping the material into the form of a membrane. However, this method is not preferred from the standpoint of the efficiency of adsorption of ions on the final porous membrane. Therefore, it is preferred that the iminodiacetic acid groups be introduced after a membranous, porous resin matrix has been prepared.

As a method for forming side chains chemically bound to the membranous, porous resin matrix and bonding iminodiacetic acid groups to the side chains, there can be mentioned, for example:

Method (1): A membranous, porous resin matrix of polyethylene is exposed to ionizing radiation, such as electron rays radiation and gamma rays radiation. Then, glycidyl methacrylate is graft-polymerized onto the ionizing radiation-exposed resin matrix in a vapor phase. The graft-polymerized, ionizing radiation-exposed resin matrix having polyglycidyl methacrylate chains grafted thereon is treated with iminodiacetic acid to bond iminodiacetic acid groups to each of the side chains by addition reaction, thereby obtaining a porous membrane of the present invention.

Method (2): A membranous, porous resin matrix of polyethylene is exposed to ionizing radiation. Then, styrene is graft-polymerized onto the ionizing radiation-exposed resin matrix in a vapor phase. The graft-polymerized, ionizing radiation-exposed resin matrix having polystyrene chains grafted thereon is chloromethylated. The resultant resin matrix is then treated with iminodiacetic acid to bond iminodiacetic acid groups to each of the side chains by addition reaction, thereby obtaining a porous membrane of the present invention.

By any of Methods (1) and (2), the chelate groups (iminodiacetic acid groups) can be uniformly bonded through side chains to both surfaces of the membranous, porous resin matrix, in which both surfaces include pore wall surfaces. If desired, the chelate groups may be bonded dominantly to the side chains bound to the pore wall surfaces.

In connection with the above, it is noted that the use of a porous membrane in which iminodiacetic acid groups, as side chains, are bonded to a membranous, porous resin matrix, is also effective for practicing the method of the present invention. For example, a porous membrane which is prepared by chlorinating the surface of a porous polyethylene membrane and then bonding iminodiacetic acid thereto by addition reaction, is useful for the method of the present invention.

The method of the present invention is extremely advantageous for simultaneously removing a plurality of different heavy metal ions from contaminated water with high efficiency.

Further, by the method of the present invention, particulate impurities, fungi and the like in contaminated water can also be efficiently removed because the porous membrane used in the method of the present invention has an extremely small pore diameter, i.e., 0.01 to 5 μm, differing from the ion exchange resin which has a pore diameter as large as tens to hundreds of micrometers. Therefore, the porous membrane of the present invention can advantageously be used for microfiltration.

The porous membrane of the present invention is especially useful for removing different heavy metal ions, such as a cobalt ion and a nickel ion, from contaminated water, such as water to be used for and waste water from a nuclear power generator. The efficiency of removal of heavy metal ions per unit weight of the porous membrane of the present invention is extremely high as compared to that of the conventional ion exchange resin. Further, the regeneration of the used porous membrane for re-use can be easily, completely conducted using only a small amount of a regenerating agent without leaving the adsorbed heavy metal ions in the regenerated membrane.

The present invention will now be described in detail with reference to the following Examples and Comparative Examples that are by no means intended to limit the scope of the present invention. EXAMPLE 1

22.1 Parts by weight of finely divided silica (Nip-Sil VN3LP, tradename, manufactured and sold by Nippon Silica K.K., Japan), 55.0 parts by weight of dibutyl phthalate (hereinafter referred to simply as "DBP"), 23.0 parts by weight of polyethylene resin powder (SH-800, tradename, manufactured and sold by Asahi Kasei Kogyo K.K., Japan) are mixed together. Then, the resultant mixture is subjected to extrusion-molding using a twin-screw extruder having a screw diameter of 30 mm to form a hollow fiber, membranous, porous resin matrix having an inner diameter of 0.7 mm and a membrane thickness of 0.25 mm. The thus obtained hollow fiber, membranous, porous resin matrix is immersed in 1,1,1-trichloroethane (chlorothene VG, tradename, manufactured and sold by The Dow Chemical Company, U.S.A.) for 60 min to extract the DBP from the hollow fiber, membranous, porous resin matrix. Further, the hollow fiber is immersed in an aqueous NaOH solution having an NaOH concentration of 40 % by weight at a temperature of 60 ° C. for about 20 min to extract the finely divided silica from the hollow fiber, porous membrane, followed by washing with water and drying.

The resultant hollow fiber, membranous, porous resin matrix is exposed to electron rays at 100 KGy in an atmosphere of nitrogen gas by means of an electron accelerator (accelerated voltage: 1.5 Mev, electric current: 1 mA). Then, glycidyl methacrylate is graft-polymerized onto the surfaces of the electron rays-exposed membranous, porous resin matrix in a vapor phase at 40 ° C. for 10 hours, to thereby form, as side chains, polyglycidyl methacrylate chains chemically bound to the surfaces of the resin matrix.

The amount of the polyglycidyl methacrylate side chains bound to the resin matrix is 1 gram (7.0 milliequivalents) per gram of the porous resin matrix as measured by the gravimetric method described above.

Then, the resultant porous membrane is immersed in an aqueous solution containing 0.4 mol/liter of sodium iminodiacetate, which solution has been adjusted to pH 12 with sodium carbonate, at 80 ° C. for 24 hours, to thereby obtain a hollow fiber, porous membrane having iminodiacetic acid groups as chelate groups, which are bonded to the polyglycidyl methacrylate chains, in an amount of 0.7 millimole (1.4 milliequivalents) per gram of the porous membrane and having a porosity of 50 % and an average pore diameter of 0.20 μm. This membrane is designated "Porous membrane A".

The amount of the iminodiacetic acid group bonded to the polyglycidyl methacrylate chains is determined by both the gravimetric method and the cobalt ion adsorption equilibrium method described above.

The porous membrane is immersed in a solution (Solution 1) containing 2,000 ppm boric acid, 0.2 ppm Li+ ion, 0.5 ppm $Ni^{2+}$ion and 0.5 ppm $Co^{2+}$ion. The amount of the porous membrane immersed in Solution 1 is 1 gram per 10 liter. The adsorption equilibrium of $Ni^{2+}$ion and $Co^{2+}$ion adsorbed on the porous membrane is determined. As a result, it is found that the adsorption equilibriums of the adsorbed $Ni^{2+}$ion and the adsorbed $Co^{2+}$ion are 0.4 mol per kg of the porous membrane and 0.05 mol per kg of the porous membrane, respectively. That is, the ratio of the amount of the $Ni^{2+}$ion adsorbed by the immersion to the amount of the $Co^{2+}$ion adsorbed by the immersion is 8/1.

EXAMPLE 2

Solution 1 is passed through Porous membrane A under a differential pressure of 1 kg/cm$^2$, and the adsorption properties of the porous membrane are determined. The amount of each of the ions is determined by flameless atomic absorption analysis. Results are shown below.

The volume of the filtrate obtained by the filtration conducted until the break-through point for $Ni^{2+}$ion is reached: 4.7 liters per meter of the membrane;

The $Ni^{2+}$ion concentration of the filtrate obtained by the filtration terminated before the break-through point for $Ni^{2+}$ion is reached: 1 ppb or less;

The amount of $Ni^{2+}$ion adsorbed on the membrane by the filtration conducted until the break-through point for $Ni^{2+}$ion is reached: 2.35 mg per meter of the membrane;

The amount of $Co^{2+}$ion adsorbed on the membrane by the filtration conducted until the break-through point for $Ni^{2+}$ion is reached: 2.30 mg per meter of the membrane;

The volume of the filtrate obtained by the filtration conducted until the break-through point for $Co^{2+}$ion is reached: 3.6 liters per meter of the membrane;

The $Co^{2+}$ion concentration of the filtrate obtained by the filtration terminated before the break-through point for $Co^{2+}$ion is reached: 1 ppb or less;

The amount of $Co^{2+}$ion adsorbed on the membrane by the filtration conducted until the break-through point for $Co^{2+}$ion is reached: 1.8 mg per meter of the membrane;

The removal of $Co^{2+}$ion (the ratio of the amount of $Co^{2+}$ion in the filtrate/the amount of $Co^{2+}$ion in the original solution) by the filtration conducted until the break-through point for $Ni^{2+}$ion is reached 0.2; and The removal of $Co^{2+}$ion (the ratio of the amount of $Co^{2+}$ion in the filtrate/the amount of $Co^{2+}$ion in the original solution) at the time when the ratio of the amount of $Ni^{2+}$ion in the filtrate to the amount of $Ni^{2+}$ion in the original solution has become 0.25: 0.9.

As apparent from the above, although the ratio of the amount of the $Ni^{2+}$ion adsorbed by the immersion to the amount of the $Co^{2+}$ion adsorbed by the immersion is 8/1, the ratio of the amount of $Ni^{2+}$ion absorbed by the filtration through the porous membrane to the amount of $Co^{2+}$ion adsorbed by the filtration through the porous membrane until the break-through point for $Ni^{2+}$ion is reached, is as low as 2.35/2.30.

On the other hand, when the filtration is further conducted even after the break-through point for $Ni^{2+}$ion has been reached, the ion-absorptivity of the porous membrane for $Co^{2+}$ion becomes extremely poor. Further, when the ratio of the amount of $Ni^{2+}$ion in the filtrate to the amount of $Ni^{2+}$ion in the original solution exceeds 0.3, the $Co^{2+}$ion in the solution is no longer removed even by the filtration through the porous membrane.

EXAMPLE 3

A solution containing 2,000 ppm boric acid, 0.2 ppm $Li+$ ion, 0.9 ppm $Ni^{2+}$ion and 0.1 ppm $Co^{2+}$ion is prepared (Solution 2). Solution 2 is passed through Porous membrane A as obtained in Example 1 under a differential pressure of 1 $kg/cm^2$, and the adsorption properties of the porous membrane are determined. The amount of each of the ions is determined by flameless atomic adsorption analysis. Results are shown below.

The ratio of the amount of the adsorbed $Ni^{2+}$ion to the amount of the adsorbed $Co^{2+}$ion when the porous membrane is immersed in Solution 2: 29/1;

The volume of the filtrate obtained by the filtration conducted until the break-through point for $Ni^{2+}$ion is reached: 5.2 liters per meter of the porous membrane;

The $Ni^{2+}$ion concentration of the filtrate obtained by the filtration terminated before the break-through point for $Ni^{2+}$ion is reached: 1 ppb or less;

The amount of $Ni^{2+}$ion adsorbed on the porous membrane by the filtration conducted until the break-through point for $Ni^{2+}$ion is reached: 4.7 mg per meter of the porous membrane;

The amount of $Co^{2+}$ion adsorbed on the porous membrane by the filtration conducted until the break-through point for $Ni^{2+}$ion is reached: 0.50 mg per meter of the porous membrane;

The volume of the filtrate obtained by the filtration conducted until the break-through point for $Co^{2+}$ion is reached: 4.9 liters per meter of the porous membrane;

The $Co^{2+}$ion concentration of the filtrate obtained by the filtration terminated before the break-through point for $Co^{2+}$ion is reached: 1 ppb or less;

The amount of $Co^{2+}$ion adsorbed on the porous membrane by the filtration conducted until the break-through point for $Co^{2+}$ion is reached: 0.49 mg per meter of the porous membrane;

The removal of $Co^{2+}$ion (the ratio of the amount of $Co^{2+}$ion in the filtrate/the amount of $Co^{2+}$ion in the original solution) by the filtration conducted until the break-through point for $Ni^{2+}$ion is reached: 0.3; and The removal of $Co^{2+}$ion (the ratio of the amount of $Co^{2+}$ion in the filtrate/the amount of $Co^{2+}$ion in the solution) at the time when the ratio of the amount of $Ni^{2+}$ion in the filtrate to the amount of $Ni^{2+}$ion in the original solution has become 0.15: 1.05. The ratio of the amount of the adsorbed $Ni^{2+}$ion to the amount of the adsorbed $Co^{2+}$ion is 4.7/0.5 when Solution 2 is filtered until the break-through point for $Ni^{2+}$ion is reached.

Comparison of the results obtained by the filtration of Solution 2 which contains $Ni^{2+}$ion and $Co^{2+}$ion in a weight ratio of 0.9/0.1 with the results obtained in Example 2 by the filtration of Solution 1 which contains $Ni^{2+}$ion and $Co^{2+}$ion in a weight ratio of 0.5/0.5, wherein each filtration is conducted until the break-through point for $Ni^{2+}$ion is reached, shows that the adsorption efficiency for each of nickel and cobalt ions is almost the same with respect to both the cases of Solution 1 and Solution 2. The adsorption efficiency for nickel and cobalt ions is defined as a ratio of the adsorbed $Ni^{2+}$ion/adsorbed $Co^{2+}$ion ratio to the $Ni^{2+}$ion/$Co^{2+}$ion ratio of the original solution.

Reference Example 1

(Evaluation of the effect of the presence of polyglycidyl methacrylate side chains and iminodiacetic groups bonded thereto in the porous membrane on the removal of a heavy metal ion and colloidal particles from a solution containing the same)

A hollow fiber, membranous, porous resin matrix is prepared from polyethylene SH-800 (manufactured and sold by Asahi Kasei Kogyo K.K., Japan) in the same manner as in Example 1. To the surfaces of the hollow fiber, porous membrane, polyglycidyl methacrylate chains are chemically bound in an amount of 10 milliequivalents per gram of the membranous, porous resin matrix, and iminoiiacetic acid groups are bonded to the polyglycidyl methacrylate chains, in the same manner as in Example 1. As a result, there is obtained a porous membrane having iminodiacetic acid groups as chelate groups in an amount of 0.8 millimole (1.6 milliequivalents) per gram of the porous membrane. The thus obtained porous membrane is designated "Porous membrane B".

The amount of the iminodiacetic acid group bonded to the side chains is determined by both the gravimetric method and the cobalt ion adsorption equilibrium method described above.

On the other hand, substantially the same procedure as described above is repeated except that the binding of polyglycidyl methacrylate side chains to the surfaces of the membranous, porous resin matrix and the bonding of iminodiacetic acid groups are omitted, to thereby obtain a porous membrane having no side chains and chelate groups. The thus obtained porous membrane is designated "Comparative membrane C".

Porous membrane B of the present invention and Comparative membrane C are individually subjected to a filtration testing using the following solution (Solution 3) prepared by dissolving a cobalt ion in water which originally contains colloidal particles, such as silica, so that the resultant solution has a concentration of a cobalt ion described below.

Solution 3

Concentration[1]) of colloidal particles: $2 \times 10^4$ particles/ml,
Concentration[2]) of cobalt ion: 1 ppm, and pH : 7.

Note: 1) The concentration of the colloidal particles in the solution is determined as follows: The above-mentioned solution is passed through a polycarbonate-made flat membrane having a pore diameter of 0.2 μm. Then, the number of colloidal particles left on the flat membrane is counted through an optical microscope at 1,500-fold magnification. From the counted number of the colloidal particles and the volume of the solution having been filtered, the concentration of the colloidal particles in the solution is calculated.

2) The concentration of cobalt ion is determined by atomic absorption analysis.

The results are shown in Table 1.

TABLE 1

|  | Porous membrane B | Comparative membrane C |
|---|---|---|
| Initial water permeability (liter/hr · $m^2$ · atm, 25° C.) | 1,000 | 1,700 |
| Removal of Cobalt ion | 99 | 0 |

TABLE 1-continued

|  | Porous membrane B | Comparative membrane C |
| --- | --- | --- |
| (%) Concentration of Cobalt ion in filtrate (ppm) | 0.01 | 1 |
| Removal of colloidal particles (%) | 99.5 | 99.0 |

As apparent from Table 1, the porous membrane of the present invention has an excellent capacity of removing both heavy metal ions and colloidal particles.

Reference Example 2

(Evaluation of the effect of the pH conditions of a solution to be treated on the removal of a heavy metal ion and colloidal particles)

Porous membrane A prepared in Example 1 is subjected to a filtration testing in substantially the same manner as described in Reference Example 1 except that the pH value is changed as indicated in Table 2. The results are shown in Table 2.

TABLE 2

|  | pH | | | | | |
| --- | --- | --- | --- | --- | --- | --- |
|  | 1 | 2 | 3 | 5 | 7 | 9 |
| Removal of Cobalt ion (%) | 3 | 10 | 50 | 90 | 99 | 99 |
| Removal of colloidal particles (%) | 99.5 | 99.5 | 99.5 | 99.5 | 99.5 | 99.5 |

As apparent from Table 2, according to the method of the present invention, the cobalt ion is efficiently removed at a pH value of 3 or more, particularly at a pH value of 7 or more. The colloidal particles are efficiently removed, irrespective of the pH value of the solution.

EXAMPLE 4

A polypropylene-made hollow fiber, membranous, porous resin matrix having a thickness of 100 μm and an average pore diameter of 0.1 μm is prepared in substantially the same manner as described in Example 1 except that a polypropylene is used instead of a polyethylene. Onto the surfaces of the polypropylene-made membranous resin matrix, glycidyl methacrylate is graft-polymerized to form side chains of a polyglycidyl methacrylate chemically bound to the membranous, porous resin matrix, followed by bonding of iminodiacetic acid groups to the side chains in the same manner as in Example 1. Thus, a hollow fiber, porous membrane having iminodiacetic acid group as a chelate group in an amount of 1.7 millimoles (3.4 milliequivalents) per gram of the porous membrane is obtained.

Reference Example 3

(Evaluation of the effect of the porous membrane of the present invention on the removal of a heavy metal ion and colloidal particles from a solution containing the same)

The porous membrane obtained in Example 4 is subjected to a filtration testing by the use of a solution having a pH value of 7 and containing colloidal particles in a concentration of $2 \times 10^4$ per ml and a nickel ion in a concentration of 1 ppm, to thereby obtain a filtrate. The concentration of nickel ion in the filtrate is 0.02 ppm or less. The removal of colloidal particles by the porous membrane is 99.5%. That is, by the method of the present invention, not only the metal ion (nickel ion) but also the colloidal particles can efficiently be removed from the contaminated water.

What is claimed is:

1. A method for simultaneously removing at least two different heavy metal ions selected from the group consisting of an iron ion, a copper ion, a cobalt ion and a nickel ion from contaminated water containing said at least two different heavy metal ions, which comprises:
   (1) filtering contaminated water containing at least two different heavy metal ions selected from the group consisting of an iron ion, a copper ion, a colbalt ion and a nickel ion through a porous membrane comprising a membranous, porous resin matrix and a plurality of side chains chemically bound to surfaces of said matrix, in which said surfaces are inclusive of pore wall surfaces, each side chain having bonded thereto an iminodiacetic acid group, to obtain a filtrate, and
   (2) terminating the filtration when the concentration of a determinant heavy metal ion in said filtrate reaches a predetermined level, wherein said determinant heavy metal ion is defined as a heavy metal ion which, among said at least two different heavy metal ions, exhibits a maximum adsorption equilibrium for said iminodiacetic acid group and wherein said predetermined level does not exceed 1/10 of the concentration of the determinant heavy metal ion in said contaminated water.

2. The method according to claim 1, wherein said contaminated water contains a nickel ion and a cobalt ion.

3. A heavy metal ion-adsorptive, porous membrane comprising a membranous, porous resin matrix and a plurality of side chains chemically bound to both surfaces of said matrix, in which said both surfaces are inclusive of pore wall surfaces, each side chain being comprised of polyglycidyl methacrylate or polystyrene, each side chain having bonded thereto an iminodiacetic acid group in an amount of 0.3 to 10 milliequivalents per gram of the porous membrane, said porous membrane having an average pore diameter of 0.01 to 5 μm and a porosity of 20 to 90%.

4. A heavy metal ion-adsorptive, hollow fiber, porous membrane comprising a hollow fiber, membranous, porous resin matrix and a plurality of side chains chemically bound to surfaces of said matrix, wherein each side chain is comprised of polyglycidyl methacrylate or polystyrene and in which said surfaces are inclusive of pore wall surfaces,
   each side chain having bonded thereto an iminodiacetic acid group in an amount of 0.3 to 10 milliequivalents per gram of the porous membrane, said porous membrane having an average pore diameter of 0.01 to 5 μm and a porosity of 20 to 90%.

* * * * *